United States Patent
Liu et al.

(10) Patent No.: US 11,554,783 B2
(45) Date of Patent: Jan. 17, 2023

(54) SYSTEMS AND METHODS TO ENHANCE EARLY DETECTION OF PERFORMANCE INDUCED RISKS FOR AN AUTONOMOUS DRIVING VEHICLE

(71) Applicant: Baidu USA LLC, Sunnyvale, CA (US)

(72) Inventors: Xiaodong Liu, San Jose, CA (US); Ning Qu, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 249 days.

(21) Appl. No.: 16/849,821

(22) Filed: Apr. 15, 2020

(65) Prior Publication Data
US 2021/0323561 A1   Oct. 21, 2021

(51) Int. Cl.
*G01S 7/497* (2006.01)
*B60W 50/00* (2006.01)
(Continued)

(52) U.S. Cl.
CPC ....... *B60W 50/0098* (2013.01); *G01S 7/4004* (2013.01); *G01S 7/497* (2013.01);
(Continued)

(58) Field of Classification Search
CPC . B60W 50/0098; G06V 20/58; G06V 10/147; G06V 30/19; G01S 7/497;
(Continued)

(56) References Cited

U.S. PATENT DOCUMENTS 9,348,710 B2 * 5/2016 Al-Wahabi ............... G06F 11/34
10,551,838 B2 * 2/2020 Liu ....................... G01S 13/865
(Continued)

FOREIGN PATENT DOCUMENTS

CN   112598500 A * 4/2021 ............. G06Q 40/08
CN   112700645 A * 4/2021 ........ B60W 60/0011
(Continued)

OTHER PUBLICATIONS

J. K. Doylend and S. Gupta, an abstract for "An overview of silicon photonics for LIDAR", Proc. SPIE 11285, Silicon Photonics XV, 112850J (Feb. 26, 2020); https://doi.org/10.1117/12.2544962 (Year: 2020).*

(Continued)

*Primary Examiner* — Cuong H Nguyen
(74) *Attorney, Agent, or Firm* — Womble Bond Dickinson (US) LLP

(57) ABSTRACT

Systems and methods of adjusting zone associated risks of a coverage zone covered by one or more sensors of an autonomous driving vehicle (ADV) operating in real-time are disclosed. As an example, the method includes defining a performance limit detection window associated with a first sensor based on a mean time between failure (MTBF) lower limit of the first sensor and a MTBF upper limit of the first sensor. The method further includes determining whether an operating time of the ADV operating in autonomous driving (AD) mode is within the performance limit detection window associated with the first sensor. The method further includes in response to determining that the operating time of the ADV operating in AD mode is within the performance limit detection window of the first sensor, adjusting a zone associated risk of the coverage zone to a performance risk of a second sensor.

24 Claims, 11 Drawing Sheets

(51) Int. Cl.
  *G01S 7/40* (2006.01)
  *G01S 13/86* (2006.01)
  G06Q 40/08 (2012.01)
  G06V 30/19 (2022.01)
  G06V 20/58 (2022.01)
  G01S 13/931 (2020.01)

(52) U.S. Cl.
  CPC .......... *G01S 13/865* (2013.01); *G01S 13/931* (2013.01); *G01S 2007/4977* (2013.01); *G06Q 40/08* (2013.01); *G06V 20/58* (2022.01); *G06V 30/19* (2022.01)

(58) Field of Classification Search
  CPC .... G01S 13/865; G01S 13/931; G01S 13/867; G01S 17/86; G05D 1/0055
  USPC ........................................................... 701/24
  See application file for complete search history.

(56) References Cited

U.S. PATENT DOCUMENTS

| | | | |
|---|---|---|---|
| 10,558,897 B2 * | 2/2020 | Sharma | G06V 20/597 |
| 2019/0049958 A1 * | 2/2019 | Liu | G01S 7/497 |
| 2019/0050692 A1 * | 2/2019 | Sharma | G06V 20/58 |
| 2020/0233420 A1 * | 7/2020 | Liu | G05D 1/0088 |
| 2021/0284200 A1 * | 9/2021 | Liu | G05D 1/0088 |
| 2021/0316755 A1 * | 10/2021 | Liu | B60W 50/045 |
| 2021/0323561 A1 * | 10/2021 | Liu | G01S 13/865 |
| 2021/0331700 A1 * | 10/2021 | Liu | G01S 17/86 |
| 2021/0407013 A1 * | 12/2021 | O'Shaughnessy | G06Q 40/08 |
| 2022/0135057 A1 * | 5/2022 | Duarte Gelvez | B60W 50/0225 701/24 |

FOREIGN PATENT DOCUMENTS

| | | | | |
|---|---|---|---|---|
| CN | 112731912 A * | 4/2021 | ........ | B60W 50/0098 |
| JP | 2012083267 A | 4/2012 | | |
| WO | WO-2021116045 A1 * | 6/2021 | ........... | G01S 13/865 |

OTHER PUBLICATIONS

A. Strasser, P. Stelzer, C. Steger and N. Druml, "Enabling Live State-of-Health Monitoring for a Safety-Critical Automotive LiDAR System," 2020 IEEE Sensors Applications Symposium (SAS), 2020, pp. 1-6, doi: 10.1109/SAS48726.2020.9220052. (Year: 2020).*
M. Al-Amin and C. H. Dagli, "ATool for Architecting Socio-Technical Problems: SoS Explorer," 2019 International Symposium on Systems Engineering (ISSE), 2019, pp. 1-7, doi: 10.1109/ISSE46696.2019.8984586. (Year: 2019).*
S. Scheding, E. Nebotand H. Durrant-Whyte, "High-integrity navigation: a frequency-domain approach," in IEEE Transactions on Control Systems Technology, vol. 8, No. 4, pp. 676-694, Jul. 2000, doi: 10.1109/87.852913. (Year: 2000).*
S. M. Adnan, A. Haque and V. S. B. K, "Reliability Improvement of Power Devices for Electric Vehicle Traction," 2021 IEEE 4th International Conference on Computing, Power and Communication Technologies (GUCON), 2021, pp. 1-6, doi: 10.1109/GUCON50781.2021.9573816 (Year: 2021).*
F. Pourdanesh, T. Q. Dinh, F. Tagliabo and P. Whiffin, "Failure Safety Analysis of Artificial Intelligence Systems for Smart/Autonomous Vehicles," 2021 24th International Conference on Mechatronics Technology (ICMT), 2021, pp. 1-6, doi: 10.1109/ICMT53429.2021.9687283 (Year: 2021).*
T. F. Horeis et al., "A Reliability Engineering Based Approach to Model Complex and Dynamic Autonomous Systems," 2020 International Conference on Connected and Autonomous Driving (MetroCAD), 2020, pp. 76-84, doi: 10.1109/MetroCAD48866.2020.00020 (Year: 2020).*
Fabian Oboril et al, „MTBF Model for AVs—From Perception Errors to Vehicle-Level Failures; printed from https://arxiv.org/pdf/2205.02621.pdf (Year: 2022).*
A. Strasser, P. Stelzer, C. Steger and N. Druml, "Enabling Live State-of-Health Monitoring for a Safety-Critical Automotive LiDAR System," 2020 IEEE Sensors Applications Symposium (SAS), 2020, pp. 1-6.
Junsung Kim, Ragunathan (Raj) Rajkumar, and Markus Jochim. 2013. "Towards dependable autonomous driving Vehicles: a system-level approach." SIGBED Rev. 10, 1 (Feb. 2013), 29-32.

* cited by examiner

SYSTEMS AND METHODS TO ENHANCE EARLY DETECTION OF PERFORMANCE INDUCED RISKS FOR AN AUTONOMOUS DRIVING VEHICLE

TECHNICAL FIELD

Embodiments of the present disclosure relate generally to operating autonomous vehicles. More particularly, embodiments of the disclosure relate to systems and methods to enhance early detection of performance induced risks for an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. As companies race to deploy SAE (Society of Automotive Engineers) Level 4 (L4) autonomous vehicles (e.g., robotaxi) within a geofenced operational design domain (ODD), one of the challenges involved is to define sensor system capabilities with associated risks for a given geofenced ODD, so that an autonomous vehicle operation can be planned with acceptable risks. Herein, an L4 autonomous vehicle refers to a fully autonomous vehicle. L4 vehicles are designed to perform all safety-critical driving functions and monitor roadway conditions for an entire trip. However, it is important to note that this is limited to the ODD of the vehicle—meaning it does not cover every driving scenario.

With respect to defining the sensor system capabilities with associated risks, one common approach is to use simulation, verification, and validation to ensure that an autonomous vehicle has a sufficient handle of most scenarios within an ODD. However, the dynamic performance of the autonomous vehicle's sensor system is yet to be addressed.

That is, current industrial approaches for L4 autonomous vehicles focus on improving the performance with redundant and diversified sensors, hardware, and algorithms. Unfortunately, very little has been reported about dynamic performance and associated risk distribution of a sensor system to define sensor system capabilities.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
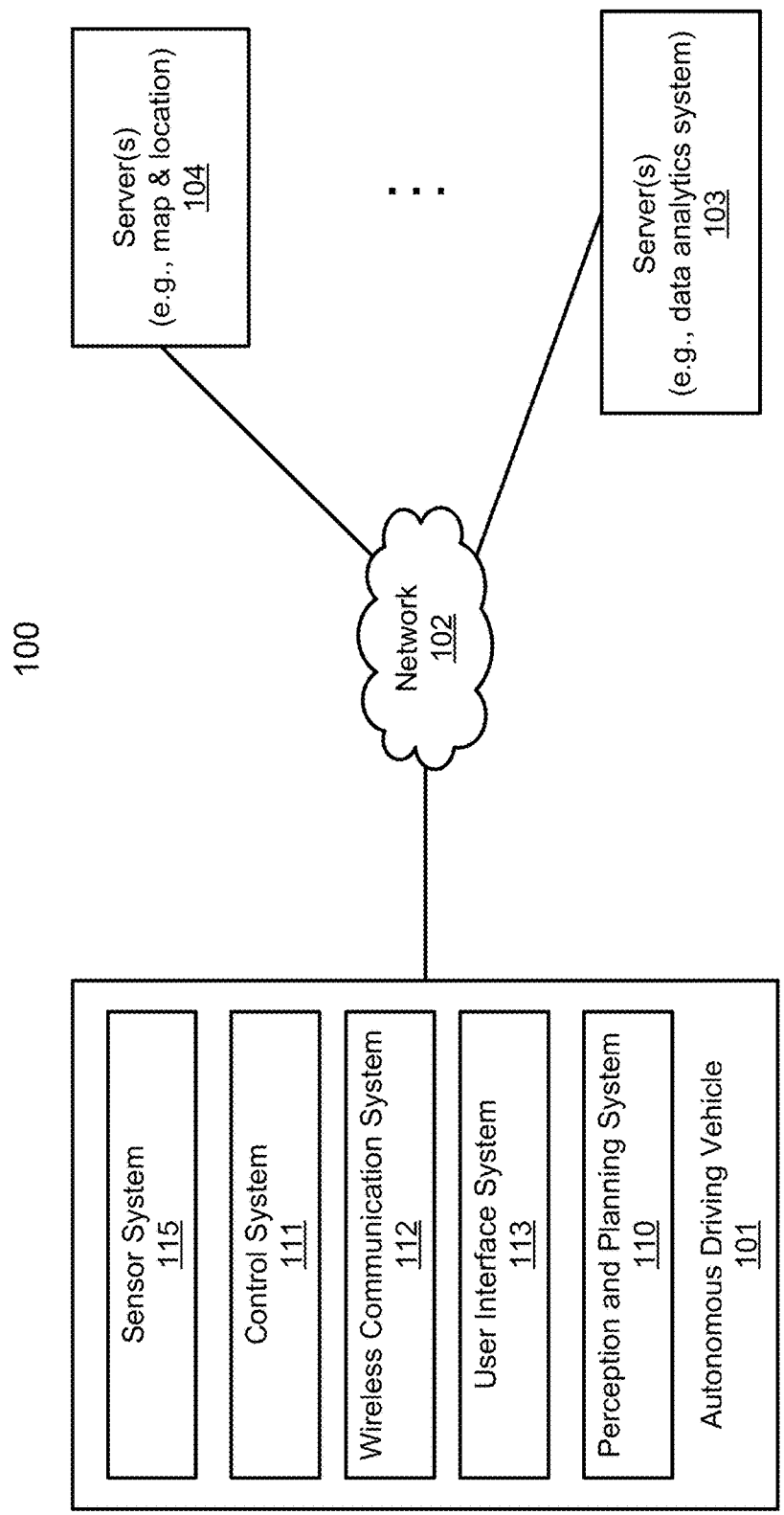
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a mean time between failure (MTBF) based sensor system performance is used to derive a sensor performance associated risk. MTBF refers to an elapsed time between failures of a sensor or sensor system during operation of the sensor or sensor system. Such failures may be due to temporary or permanent loss of performance that can generate, for example, a false positive or false negative obstacle detection. Furthermore, a performance limit detection window may be defined based on a sensor system's worst performance from the sensor system's MTBF distribution curve. For example, the sensor system's worst performance may represent a lower limit of the distribution curve while the sensor system's nominal performance may represent an upper limit of the distribution curve. Based on the lower and upper limits, the performance limit detection window can be defined, and using the detection window, the sensor system's performance limit induced risk can be adjusted in real-time.

In one aspect, a method of adjusting zone associated risks of a coverage zone covered by one or more sensors of an autonomous driving vehicle (ADV) operating in real-time is disclosed. The method may include defining a performance limit detection window associated with a first sensor based on a mean time between failure (MTBF) lower limit of the first sensor and a MTBF upper limit of the first sensor. The method may further include determining whether an operating time of the ADV operating in autonomous driving (AD) mode is within the performance limit detection window associated with the first sensor. The method may further include in response to determining that the operating time of the ADV operating in AD mode is within the performance limit detection window of the first sensor, adjusting a zone associated risk of the coverage zone to a performance risk of a second sensor.

In one embodiment, the method may further include determining the MTBF lower limit of the first sensor based on a MTBF distribution associated with the first sensor, and determining the MTBF upper limit of the first sensor based on the MTBF distribution associated with the first sensor. The MTBF lower limit of the first sensor may be a worst case MTBF of the first sensor, and the MTBF upper limit of the first sensor may be a nominal performance MTBF of the first sensor.

In one embodiment, the method may further include in response to determining that the operating time of the ADV operating in AD mode is within the performance limit detection window of the first sensor, determining whether performance limitation of the first sensor is confirmed. The method may further include in response to determining that the performance limitation of the first sensor is confirmed, determining that the coverage zone is only covered by the second sensor and determining whether the performance limitation of the first sensor is temporary. The method may further include in response to determining that the performance limitation of the first sensor is temporary, adjusting the zone associated risk of the coverage zone to the performance risk of the second sensor.

In one embodiment, the method may further include in response to determining that the performance limitation of the first sensor is not temporary, determining whether the zone is covered by the second sensor. The method may further include in response to determining that the zone is not covered by the second sensor, declaring the zone as a no coverage zone. The method may further include defining a performance limit detection window associated with the second sensor based on a MTBF lower limit of the second sensor and a MTBF upper limit of the second sensor. The method may still further include adjusting the zone associated risk of the coverage zone to a combined performance risk of the first and second sensors subsequent to adjusting the zone associated risk of the coverage zone to the performance risk of the second sensor.

In one embodiment, the method may also include determining whether the operating time of the ADV operating in AD mode is within the performance limit detection window associated with the second sensor. The method may further include in response to determining that the operating time of the ADV operating in AD mode is within the performance limit detection window of the second sensor, ensuring the second sensor is operating as intended based on additional diagnostics and determining that the coverage zone is only covered by the first sensor.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
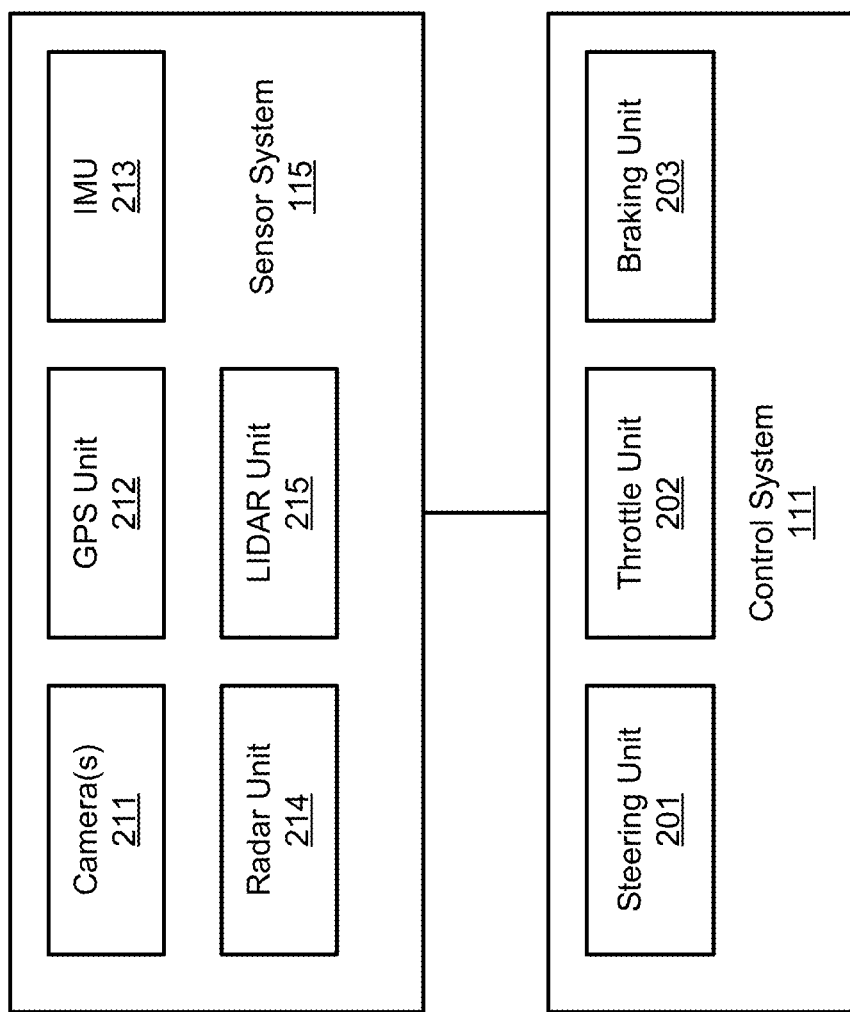
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Figure 3A:
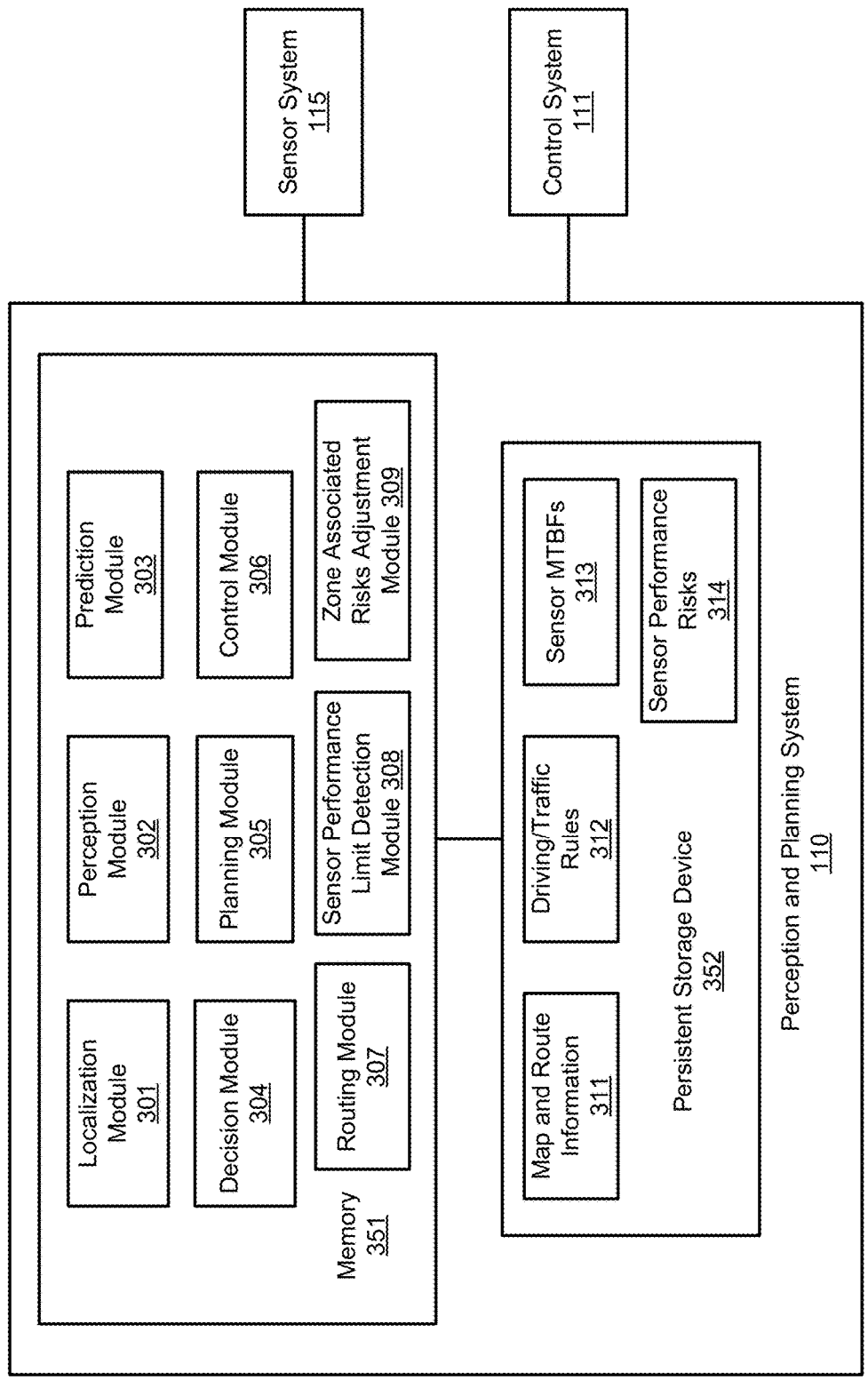
FIGS. 3A-3B are block diagrams illustrating an example of a perception and planning system used with an autonomous vehicle according to one embodiment.
Figure 3B:
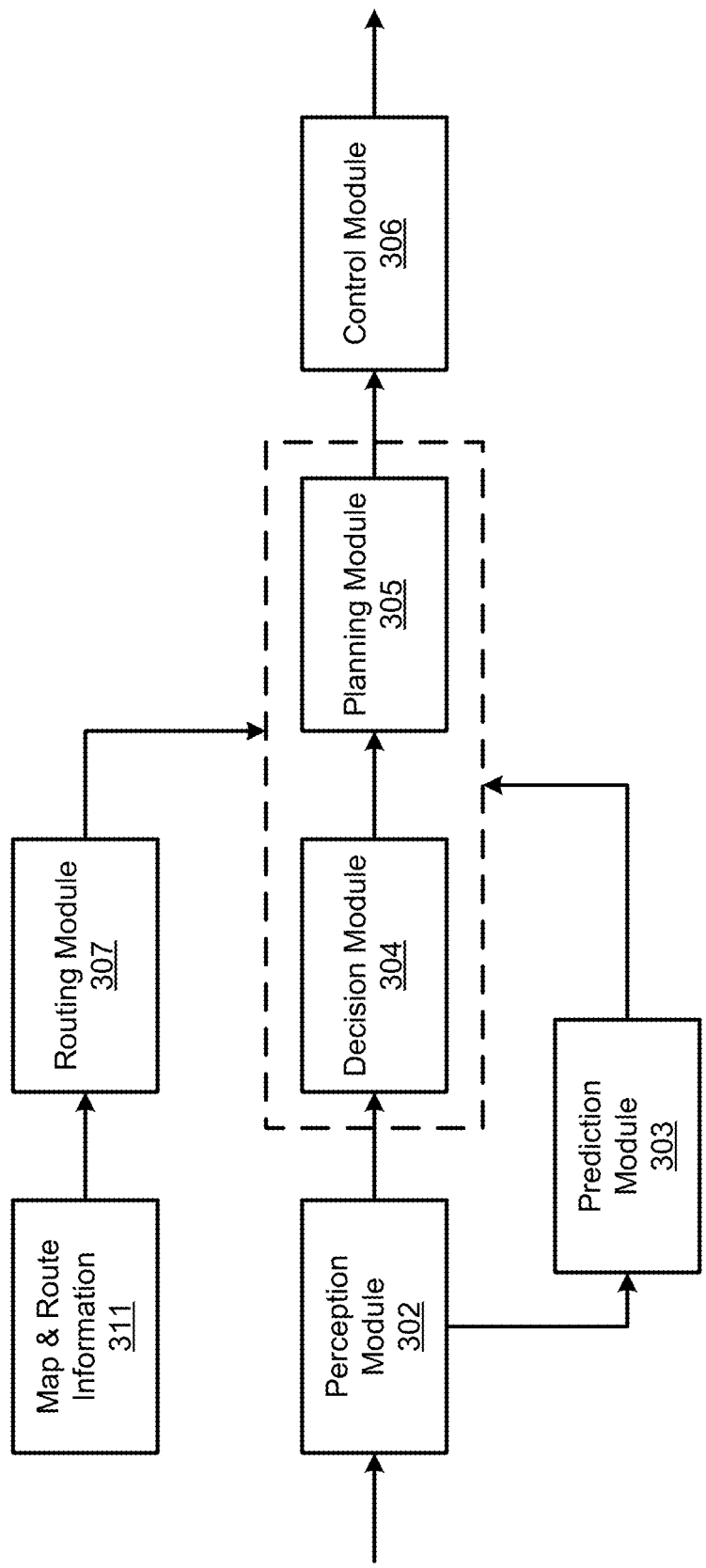

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, sensor performance limit detection module 308, and zone associated risks adjustment module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, sensor performance limit detection module 308 is configured to define a sensor performance limit detection window (also referred to as early detection window) for a zone covered by a specific sensor (e.g., camera(s) 211, radar unit 214, LIDAR 215, a sonar sensor, an infrared sensor, etc.) on autonomous vehicle 101. As an example, referring now to FIG. 4, which is a diagram illustrating an autonomous vehicle within an example geofenced ODD according to one embodiment, autonomous vehicle 101 may be deployed within ODD 400 defined by geofence 410. Geofenced ODD 400 may be a specific operating domain in which autonomous vehicle 101 is designed to properly operate, including but not limited to geographic area, roadway type, speed range, environmental conditions (weather, daytime/nighttime, etc.), and other domain constraints.

Figure 4:
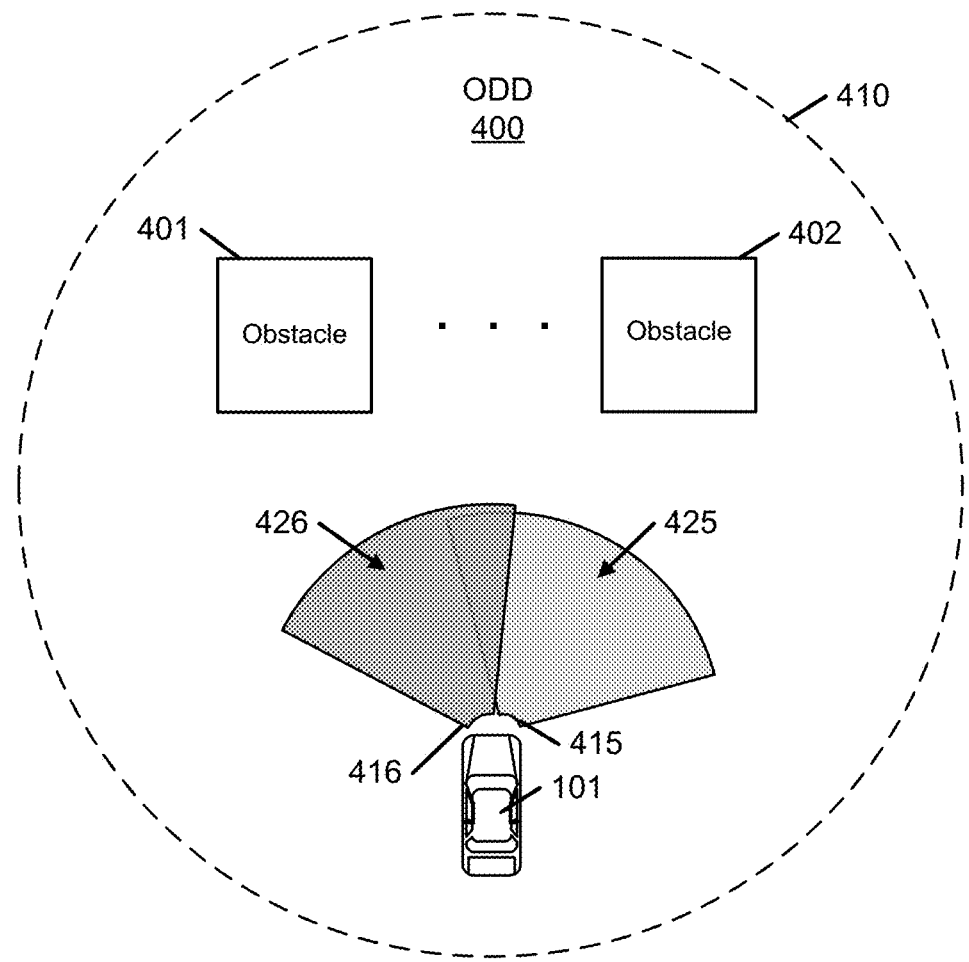
FIG. 4 is a diagram illustrating an autonomous vehicle within an example geofenced ODD according to one embodiment.

With continued reference to FIG. 4, upon entering geofenced ODD 400, one or more of sensors 415-416 on autonomous vehicle 101 may detect one or more obstacles 401-402 (e.g., other vehicles, pedestrians, buildings, structures, etc.) depending on whether the obstacles 401-402 are within coverage zones (or coverage areas) 425-426 covered by sensors 415-416, respectively. Even if an obstacle is detected by sensor 415 and/or sensor 416, the detection, however, may be false positive (i.e., ghost obstacle) or false negative (i.e., missing obstacle) as the sensor loses its performance over elapsed time, thereby inducing sensor performance risks and causing zone associated risks involving coverage zones 425-426. This failure, where the sensor loses its performance, can be either be permanent or temporary when autonomous vehicle 101 is deployed within geofenced ODD 400. To reduce or eliminate such failure, two MTBFs may be used to define a performance limit detection window, as discussed in more detail herein below.

Figure 5:
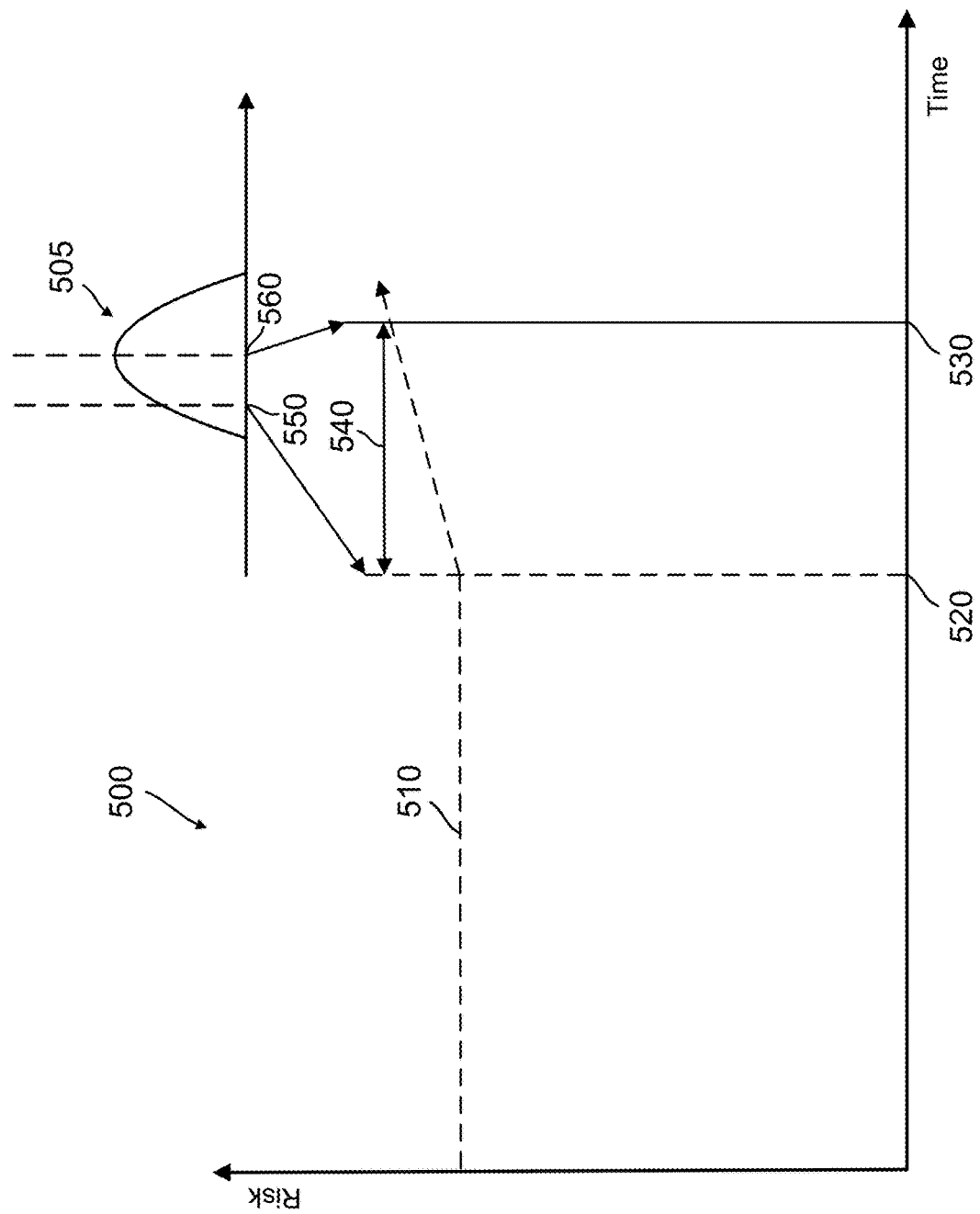
FIG. 5 is a graph illustrating an example of a mean time between failure (MTBF) based sensor performance limit detection window according to embodiment.

FIG. 5 is a graph illustrating an example of an MTBF-based sensor performance limit detection window according to embodiment. In FIG. 5, graph 500 shows a performance risk (y-axis) as a function of operating time (x-axis) for a zone (e.g., coverage zone 425/426) covered by a particular sensor (e.g., sensor 415/416). In one embodiment, the "Time" axis (x-axis) of graph 500 may represent an operating time of autonomous vehicle 101 operating in autonomous driving mode. The "Time" axis of graph 500 may be measured in hours (though it may also be measured in minutes, seconds, or any suitable metric unit) and the performance risk axis (labelled as "Risk" on y-axis) may be measured as an inverse or reciprocal of time (e.g., 1/hour).

Still referring to FIG. 5, dashed line 510 may represent sensor performance risks of a particular sensor (e.g., sensor 415/416) over a time period which is derived from respective sensor's nominal MTBF. As autonomous vehicle 101 operates close to or beyond a first elapsed time 520, a single point failure risk begins to increase through a second elapsed time 530 due to performance limitation of the sensor. The higher the risk, the probability of an obstacle detection being false positive or false negative also increases.

In FIG. 5, the first elapsed time 520 may be the sensor's worst case MTBF (or sensor MTBF lower limit) and the second elapsed time 530 may be the sensor's nominal performance MTBF (or sensor MTBF upper limit). In one embodiment, the sensor MTBF lower and upper limits may be obtained from an MTBF distribution curve 505, for example, during the autonomous vehicle 101's in-field testing or while the vehicle 101 operating in shade mode, and they may be stored as part of sensor MTBFs 313 of FIG. 3A. As shown in FIG. 5, the sensor MTBF lower limit (i.e., elapsed time 520) may correspond to a lower limit MTBF 550 of MTBF distribution curve 505 and the sensor MTBF upper limit (i.e., elapsed time 530) may correspond to a nominal MTBF (or upper limit MTBF) 560 of MTBF distribution curve 505. Accordingly, in FIG. 5, a performance limit detection window 540 can be defined based on the sensor MTBF lower and upper limits. That is, the detection window 540 may represent a time period between the sensor MTBF lower and upper limits in which the sensor performance limit can be detected.

Figure 6:
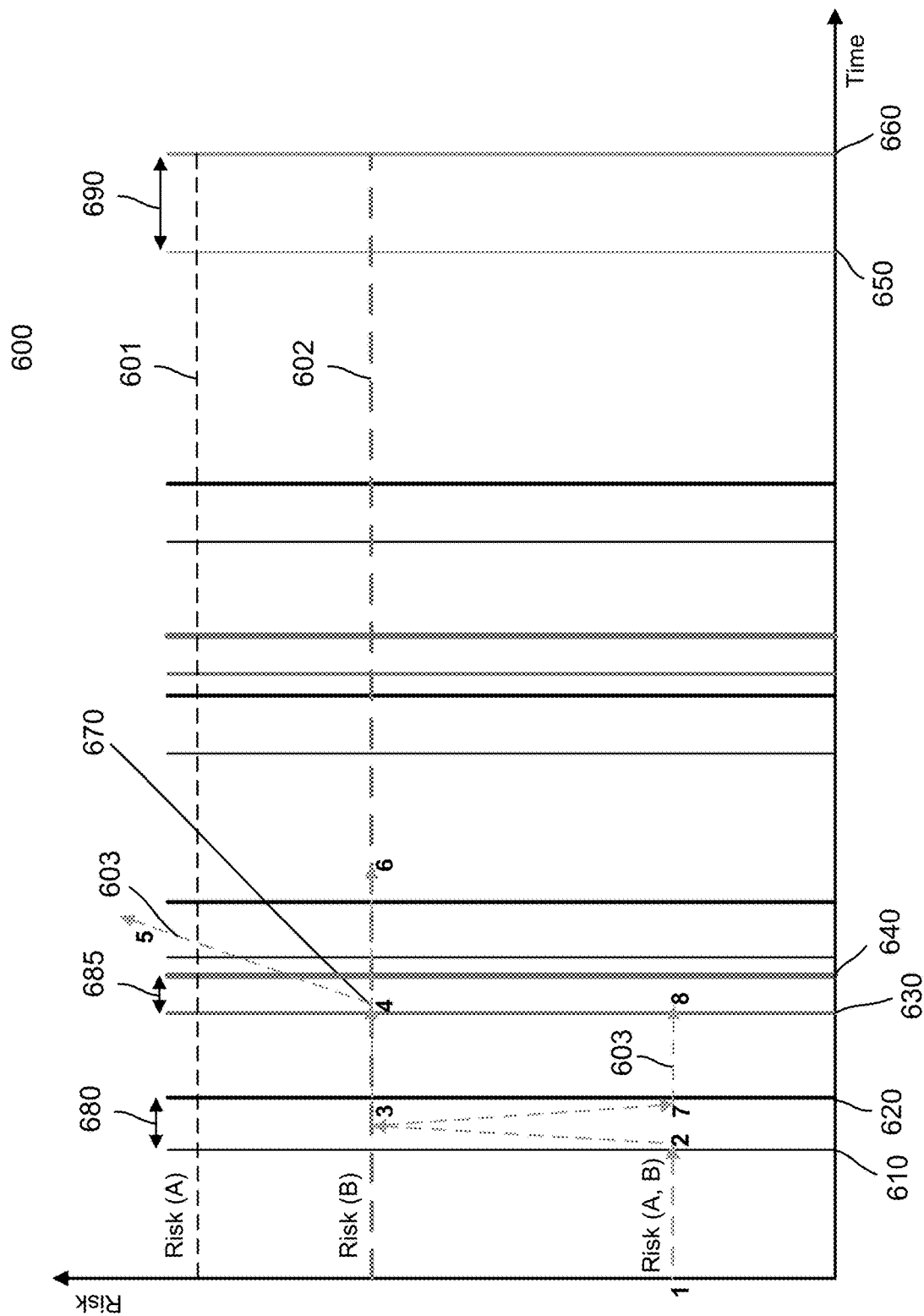
FIG. 6 is a graph illustrating examples of dynamic risk updates as a function of operating time for a given sensor coverage zone according to one embodiment.

Referring back to FIG. 3A, zone associated risks adjustment module 309 may compute or derive performance risks of each sensor over a time period (stored as part of sensor performance risks 314) based on MTBFs 313 (i.e., MTBF lower and upper limits of a sensor that define a performance limit detection window), and adjust zone associated risks in real-time based on the derived performance risks of the sensor. For example, referring now to FIG. 6 (a graph illustrating examples of dynamic risk updates as a function of operating time for a given sensor coverage zone according to one embodiment), graph 600 shows performance risks (y-axis) as a function of operating time (x-axis) for a coverage zone covered by two sensors (sensor A and sensor B). It is noted that FIG. 6 shows two sensors merely as an example, and that any number of sensors may be utilized. In one embodiment, the "Time" axis (x-axis) of graph 600 may represent an operating time of autonomous vehicle 101 operating in autonomous driving (AD) mode. The "Time" axis of graph 600 may be measured in hours (though it may also be measured in minutes, seconds, or any suitable metric unit) and the performance risk axis (labelled as "Risk" on y-axis) may be measured as an inverse or reciprocal of time (e.g., 1/hour).

In FIG. 6, dashed line 601 represents performance risks of a first sensor (referred to as sensor A), dashed line 602 represents performance risks of a second sensor (referred to as sensor B), and dashed line 603 represents zone associated risks of a zone covered by sensors A and B over a time period. It is assumed that sensors A and B do not undergo performance limitation simultaneously prior to MTBF(A, B). In some embodiments, MTBF(A, B) may be considered or determined during a design phase and verified during a testing phase.

With continued reference to FIG. 6, elapsed time 610 represents sensor A MTBF lower limit (referred to as "MTBF(A) @ lower limit"), elapsed time 620 represents sensor A MTBF upper limit (referred to as "MTBF(A) @ upper limit"), elapsed time 630 represents sensor B MTBF lower limit (referred to as "MTBF(B) @ lower limit"), and elapsed time 640 represents sensor B MTBF upper limit (referred to as "MTBF(B) @ upper limit"). Also, elapsed time 650 represents MTBF lower limit of a combined sensor, i.e., combination of sensors A and B, (referred to as "MTBF(A @ lower limit, B @ lower limit)"), and elapsed time 660 represents MTBF upper limit of the combined sensor (referred to as "MTBF(A @ upper limit, B @ upper limit)"). Accordingly, performance limit detection window 680 may represent a time period between the sensor A MTBF lower and upper limits in which the sensor A performance limit can be detected, performance limit detection window 685 may represent a time period between the sensor B MTBF lower and upper limits in which the sensor B performance limit can be detected, and performance limit detection window 690 may represent a time period between the combined sensor MTBF lower and upper limits in which the combined sensor performance limit can be detected. Detection window 690 may represent a time period with no coverage or additional diagnostics are required. In some embodiments, MTBF(A) @ lower limit, MTBF(A) @ upper limit, MTBF(B) @ lower limit, MTBF(B) @ upper limit, MTBF(A @ lower limit, B @ lower limit), and MTBF(A @ upper limit, B @ upper limit) may be stored as part of sensor MTBFs 313 of FIG. 3A.

Still referring to FIG. 6, during ODD operation of autonomous vehicle 101 in real-time, from point 1 to point 2 (shown on dashed line 603), the sensor coverage zone is covered by two sensors (sensors A and B), and zone associated risks adjustment module 309 may determine that the zone associated risk is Risk (A, B). As the elapsed time approaches or passes point 2, the probability of sensor A undergoing a performance limitation increases. Thus, during a confirmation of the sensor A undergoing performance limitation, module 309 may consider or determine that the coverage zone is covered by sensor B only, and adjust the zone associated risk to Risk (B). At point 3, if sensor A performance limitation is detected (during detection window 680), such performance limitation may be permanent or temporary. For temporary performance limitation, as an example, module 309 may adjust the zone associated risk from point 3 (Risk (B)), to point 7 (Risk (A, B)), and to point 8 (Risk (A, B)). On the other hand, for permanent or persistent performance limitation (sensor A), module 309 may adjust the zone associated risk from point 3 (Risk (B)), to point 4 (Risk, (B)), which is only covered by sensor B. Since point 4 is close to or beyond elapsed time 630 (i.e., sensor B MTBF lower limit), detection window 685 may be invoked or triggered. At this point (shown at 670 on graph 600), additional diagnostics are required to ensure sensor B performance is operating as intended, and proceed with (or adjusted to) point 6 with coverage from sensor A only. Otherwise, the zone associated risk may be adjusted or proceed from point 4 to point 5, which is a no coverage zone. In some embodiments, the foregoing described MTBFs and risks may be computed using the following equations:

$MTBF(A) = 10^a(\text{Time})$  Sensor A:

$MTBF(B) = 10^b(\text{Time})$  Sensor B:

Combined $MTBF(A,B) = 10^{(a+b)}(\text{Time})$ $Risk(A) = 10^{-a}(1/\text{Time})$ $Risk(B) = 10^{-b}(1/\text{Time})$ $Risk(A,B) = 10^{-(a+b)}(1/\text{Time})$, where a and b are integer values greater than or equal to 0, and Time may be measured in hour, minute, second, or any suitable metric unit.

As an example, if Time is measured in hour and each of sensors A and B has an failure (e.g., either false positive or false negative) every 1,000 hours when operating within ODD, then each of a and b would be equal to 3.

Figure 7:
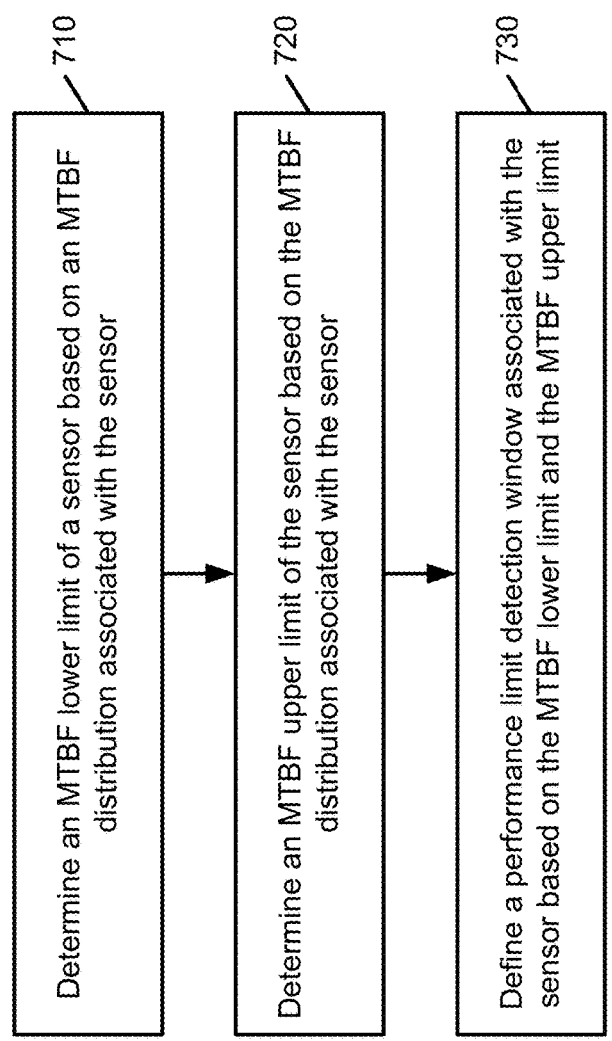
FIG. 7 is a flowchart illustrating an example method of defining a sensor performance limit detection window according to one embodiment.

FIG. 7 is a flowchart illustrating an example method of defining a sensor performance limit detection window according to one embodiment. Method 700 may be performed by hardware, software, or a combination of both. For example, method 700 may be performed by sensor performance limit detection module 308 of FIG. 3A.

Referring to FIG. 7, at block 710, an MTBF lower limit of a sensor is determined based on an MTBF distribution associated with the sensor. At block 720, an MTBF upper limit of the sensor is determined based on the MTBF distribution associated with the sensor. At block 730, a performance limit detection window associated with the sensor is defined based on the MTBF lower limit and the MTBF upper limit.

Figure 8:
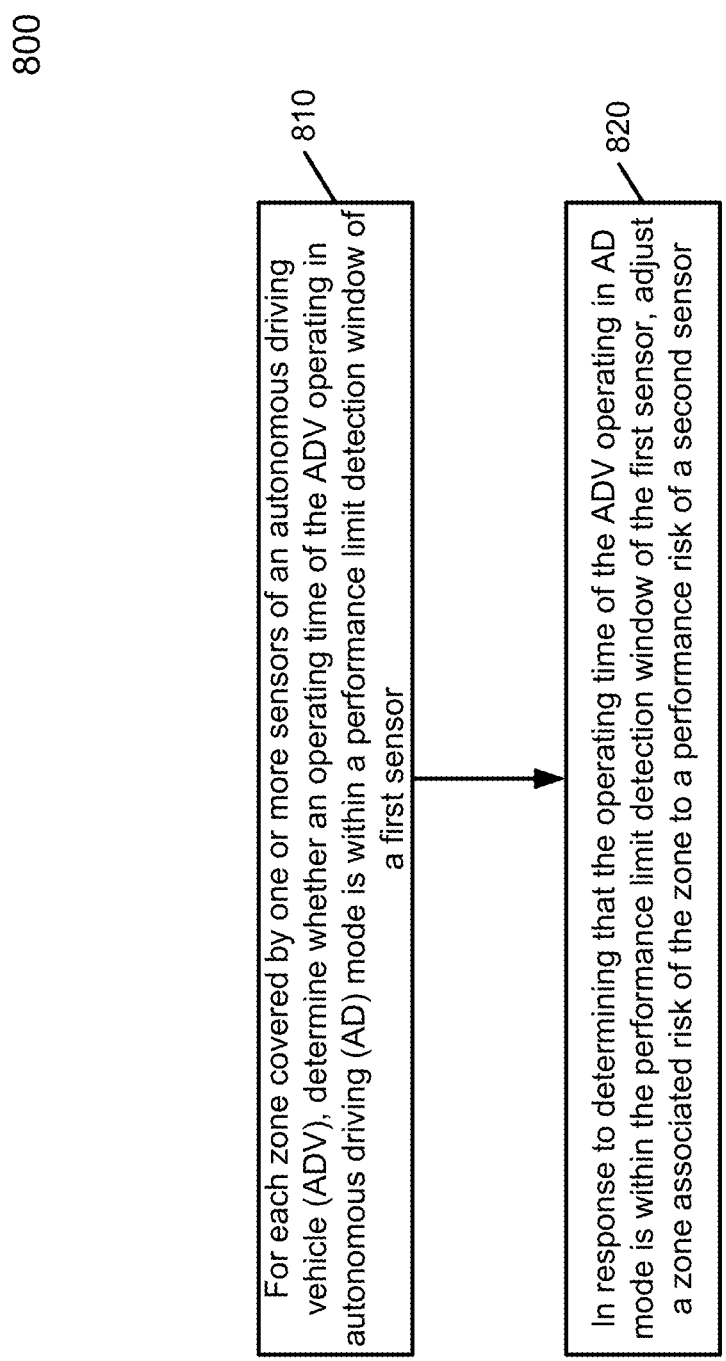
FIG. 8 is a flowchart illustrating an example method of adjusting zone associated risks of a coverage zone in real-time according to one embodiment.

FIG. 8 is a flowchart illustrating an example method of adjusting zone associated risks of a coverage zone in real-time according to one embodiment. Method 800 may be performed by hardware, software, or a combination of both. For example, method 800 may be performed by zone associated risks adjustment module 309 of FIG. 3A.

Referring to FIG. 8, at block 810, for each zone covered by one or more sensors of an autonomous driving vehicle (ADV), it is determined whether an operating time of the ADV operating in AD mode is within a performance limit detection window of a first sensor. At block 820, in response to determining that the operating time of the ADV operating in AD mode is within the performance limit detection window of the first sensor, adjust a zone associated risk of the zone to a performance risk of a second sensor.

Figure 9:
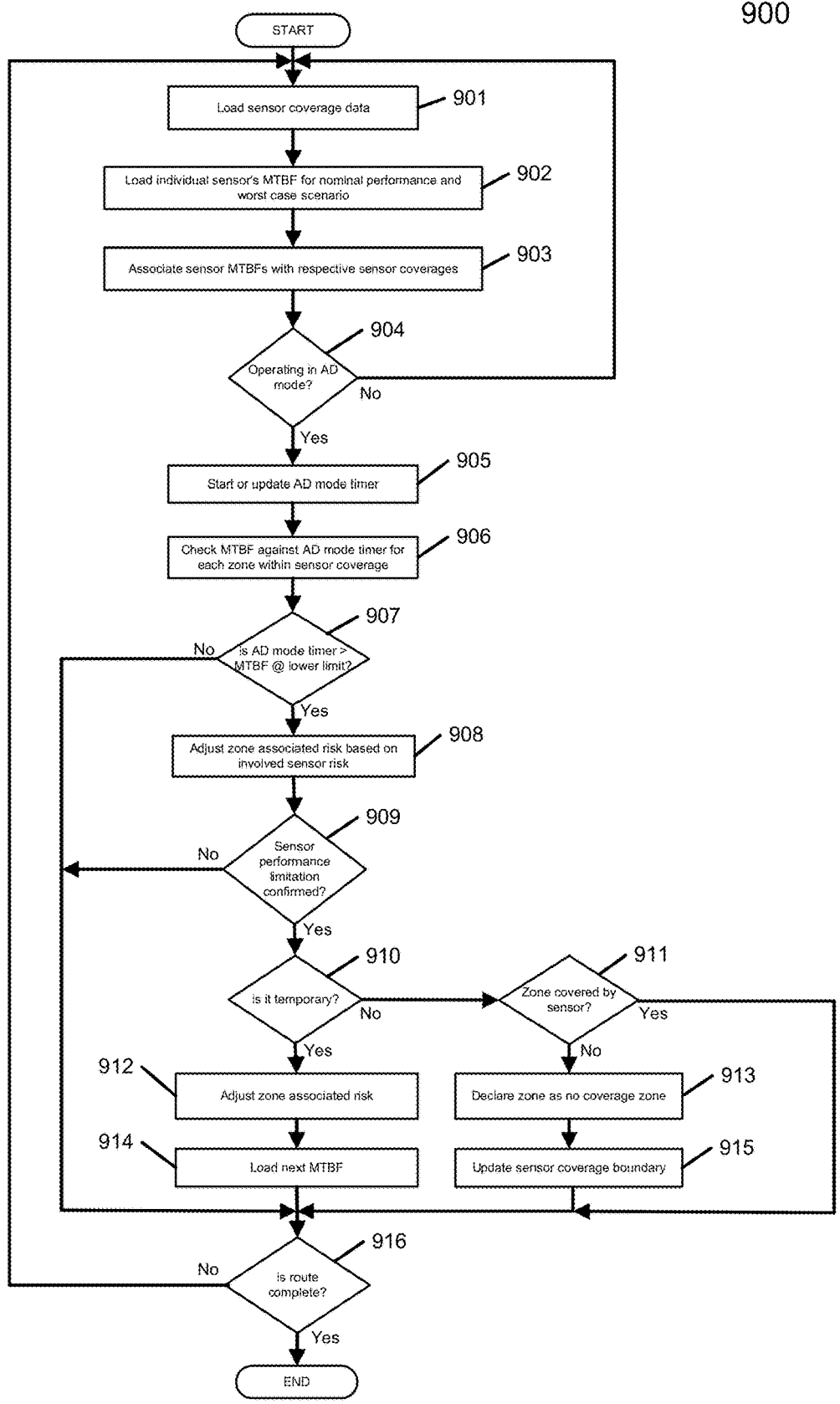
FIG. 9 is a flowchart illustrating another example method of adjusting zone associated risks of a coverage zone in real-time according to one embodiment.

FIG. 9 is a flowchart illustrating another example method of adjusting zone associated risks of a coverage zone in real-time according to one embodiment. Method 900 may be performed by hardware, software, or a combination of both. For example, method 900 may be performed by sensor performance limit detection module 308 and/or zone associated risks adjustment module 309 of FIG. 3A.

Referring to FIG. 9, at block 901, sensor coverage data (e.g., aerial images, land cover data, digital elevation models, etc.) is loaded. In some embodiments, the sensor coverage data may be in the form of regular or irregular grids, point clouds, and/or meshes. At block 902, individual sensor's MTBFs for nominal performance and worst case scenario (e.g., sensor MTBFs 313 of FIG. 3A) are loaded. At block 903, the sensor's MTBFs are associated with respective sensor coverages. At block 904, it is determined whether an autonomous driving vehicle (e.g., vehicle 101 of FIG. 1) is operating in AD mode. If so, at block 905, an AD mode timer is started or updated. Otherwise, method 900 returns to block 901. At block 906, for each zone within a sensor coverage, a first sensor's (e.g., a primary sensor) MTBFs associated with the sensor coverage are checked against the AD mode timer. At block 907, it is determined whether the AD mode timer is greater than the first sensor's MTBF @ lower limit (i.e., within the first sensor's performance limit detection window). If so, at block 908, a zone associated risk is adjusted based on an involved sensor risk (e.g., sensor performance risk of a second sensor). That is, it may be determined that the zone is covered by the second sensor (e.g., a secondary or backup sensor). Otherwise, method 900 proceeds to block 916 to determine whether the route is complete. At block 909, it may be determined whether the first sensor's performance limitation is confirmed. If so, method 900 proceeds to block 910. Otherwise, method 900 proceeds to block 916. At block 910, it is determined whether the confirmed sensor performance limitation is temporary. If so, method 900 proceeds to block 912 to adjust the zone associated risk, for example, to a performance risk of the second sensor or a combined performance risk of the first and second sensors, then proceeds to block 914 to load a next MTBF (e.g., MTBF @ lower limit and/or MTBF @ upper limit) of the second sensor. Otherwise, method 900 proceeds to block 911 where it is determined whether the zone is covered by the second sensor. If so, method 900 proceeds to block 916. Otherwise, method 900 proceeds to block 913 where the zone is declared as a no coverage zone. At block 915, the sensor coverage boundary is updated, then method 900 proceeds to block 916. At block 916, if the route is complete, method 900 ends. Otherwise, method 900 returns to block 901.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
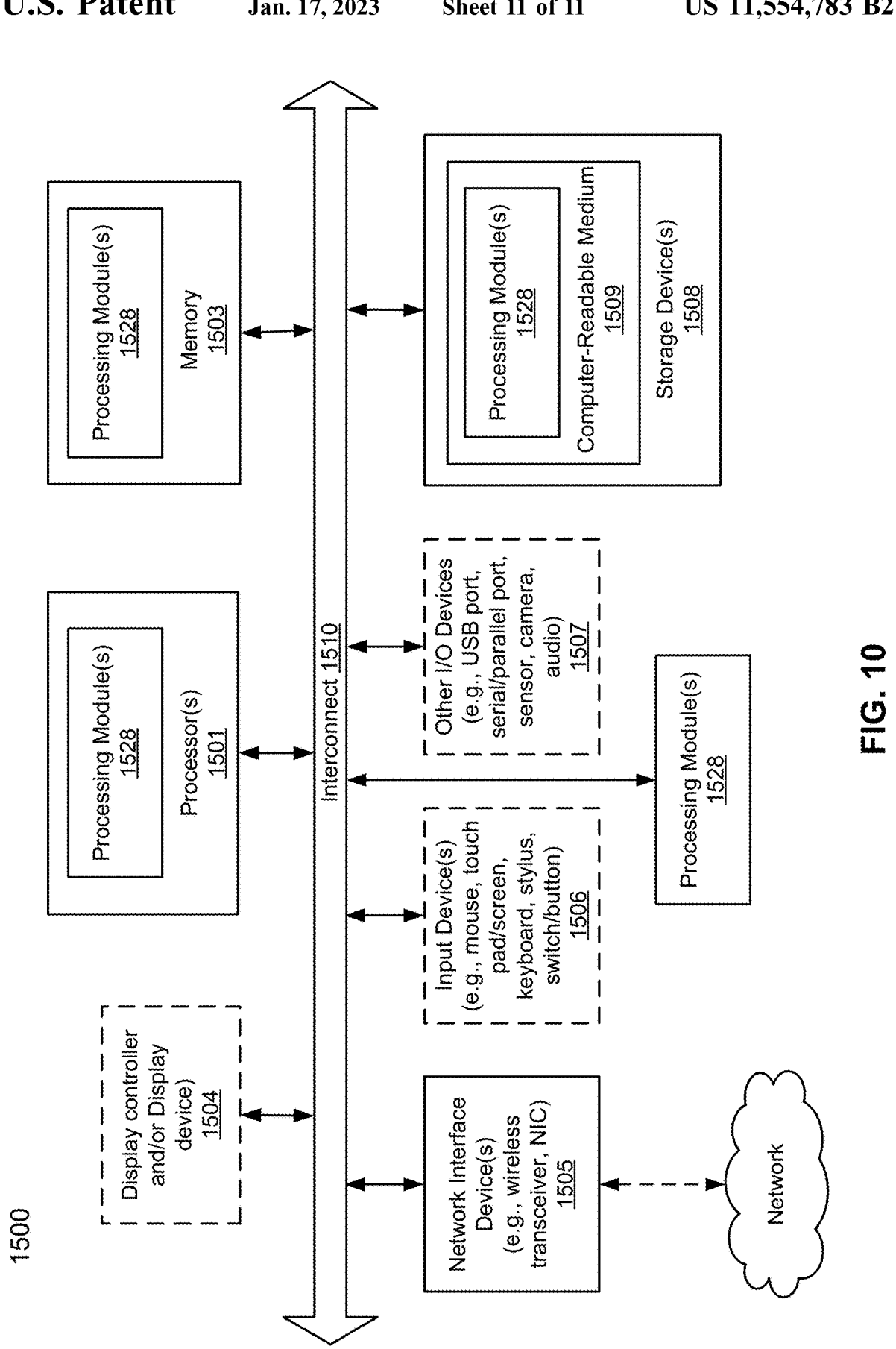
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, or any of systems 110-115 of FIG. 1. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, sensor performance limit detection module 308, and zone associated risks adjustment module 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of adjusting zone associated risks of a coverage zone covered by a plurality of sensors of an autonomous driving vehicle (ADV) operating in real-time, comprising:
defining a performance limit detection window associated with a first sensor based on a mean time between failure (MTBF) lower limit of the first sensor and a MTBF upper limit of the first sensor;

determining whether an operating time of the ADV operating in autonomous driving (AD) mode is within the performance limit detection window associated with the first sensor; and in response to determining that the operating time of the ADV operating in AD mode is within the performance limit detection window of the first sensor, adjusting a zone associated risk of the coverage zone to a performance risk of a second sensor.

2. The method of claim 1, further comprising:

determining the MTBF lower limit of the first sensor based on a MTBF distribution associated with the first sensor; and determining the MTBF upper limit of the first sensor based on the MTBF distribution associated with the first sensor.

3. The method of claim 2, wherein the MTBF lower limit of the first sensor is a worst case MTBF of the first sensor, and the MTBF upper limit of the first sensor is a nominal performance MTBF of the first sensor.

4. The method of claim 1, further comprising:

in response to determining that the operating time of the ADV operating in AD mode is within the performance limit detection window of the first sensor, determining whether performance limitation of the first sensor is confirmed;

in response to determining that the performance limitation of the first sensor is confirmed, determining that the coverage zone is only covered by the second sensor and determining whether the performance limitation of the first sensor is temporary; and in response to determining that the performance limitation of the first sensor is temporary, adjusting the zone associated risk of the coverage zone to the performance risk of the second sensor.

5. The method of claim 4, further comprising:

in response to determining that the performance limitation of the first sensor is not temporary, determining whether the zone is covered by the second sensor; and in response to determining that the zone is not covered by the second sensor, declaring the zone as a no coverage zone.

6. The method of claim 1, further comprising: defining a performance limit detection window associated with the second sensor based on a MTBF lower limit of the second sensor and a MTBF upper limit of the second sensor.

7. The method of claim 4, further comprising: adjusting the zone associated risk of the coverage zone to a combined performance risk of the first and second sensors subsequent to adjusting the zone associated risk of the coverage zone to the performance risk of the second sensor.

8. The method of claim 6, further comprising:

determining whether the operating time of the ADV operating in AD mode is within the performance limit detection window associated with the second sensor;

in response to determining that the operating time of the ADV operating in AD mode is within the performance limit detection window of the second sensor, ensuring the second sensor is operating as intended based on additional diagnostics and determining that the coverage zone is only covered by the first sensor.

9. A non-transitory machine-readable medium having instructions stored therein, which when executed by a processor, cause the processor to perform operations, the operations comprising:

defining a performance limit detection window associated with a first sensor based on a mean time between failure (MTBF) lower limit of the first sensor and a MTBF upper limit of the first sensor;

determining whether an operating time of an autonomous driving vehicle (ADV) operating in autonomous driving (AD) mode is within the performance limit detection window associated with the first sensor; and in response to determining that the operating time of the ADV operating in AD mode is within the performance limit detection window of the first sensor, adjusting a zone associated risk of a coverage zone to a performance risk of a second sensor.

10. The non-transitory machine-readable medium of claim 9, wherein the operations further comprise:

determining the MTBF lower limit of the first sensor based on a MTBF distribution associated with the first sensor; and determining the MTBF upper limit of the first sensor based on the MTBF distribution associated with the first sensor.

11. The non-transitory machine-readable medium of claim 10, wherein the MTBF lower limit of the first sensor is a worst case MTBF of the first sensor, and the MTBF upper limit of the first sensor is a nominal performance MTBF of the first sensor.

12. The non-transitory machine-readable medium of claim 9, wherein the operations further comprise:

in response to determining that the operating time of the ADV operating in AD mode is within the performance limit detection window of the first sensor, determining whether performance limitation of the first sensor is confirmed;

in response to determining that the performance limitation of the first sensor is confirmed, determining that the coverage zone is only covered by the second sensor and determining whether the performance limitation of the first sensor is temporary; and in response to determining that the performance limitation of the first sensor is temporary, adjusting the zone associated risk of the coverage zone to the performance risk of the second sensor.

13. The non-transitory machine-readable medium of claim 12, wherein the operations further comprise:

in response to determining that the performance limitation of the first sensor is not temporary, determining whether the zone is covered by the second sensor; and in response to determining that the zone is not covered by the second sensor, declaring the zone as a no coverage zone.

14. The non-transitory machine-readable medium of claim 9, wherein the operations further comprise: defining a performance limit detection window associated with the second sensor based on a MTBF lower limit of the second sensor and a MTBF upper limit of the second sensor.

15. The non-transitory machine-readable medium of claim 12, wherein the operations further comprise: adjusting the zone associated risk of the coverage zone to a combined performance risk of the first and second sensors subsequent to adjusting the zone associated risk of the coverage zone to the performance risk of the second sensor.

16. The non-transitory machine-readable medium of claim 14, wherein the operations further comprise:

determining whether the operating time of the ADV operating in AD mode is within the performance limit detection window associated with the second sensor;

in response to determining that the operating time of the ADV operating in AD mode is within the performance limit detection window of the second sensor, ensuring the second sensor is operating as intended based on additional diagnostics and determining that the coverage zone is only covered by the first sensor.

17. A data processing system, comprising:
a processor; and
a memory coupled to the processor to store instructions, which when executed by the processor, cause the processor to perform operations, the operations including:
defining a performance limit detection window associated with a first sensor based on a mean time between failure (MTBF) lower limit of the first sensor and a MTBF upper limit of the first sensor;
determining whether an operating time of an autonomous driving vehicle (ADV) operating in autonomous driving (AD) mode is within the performance limit detection window associated with the first sensor; and
in response to determining that the operating time of the ADV operating in AD mode is within the performance limit detection window of the first sensor, adjusting a zone associated risk of a coverage zone to a performance risk of a second sensor.

18. The data processing system of claim 17, wherein the operations further include:
determining the MTBF lower limit of the first sensor based on a MTBF distribution associated with the first sensor; and
determining the MTBF upper limit of the first sensor based on the MTBF distribution associated with the first sensor.

19. The data processing system of claim 18, wherein the MTBF lower limit of the first sensor is a worst case MTBF of the first sensor, and the MTBF upper limit of the first sensor is a nominal performance MTBF of the first sensor.

20. The data processing system of claim 17, wherein the operations further include:
in response to determining that the operating time of the ADV operating in AD mode is within the performance limit detection window of the first sensor, determining whether performance limitation of the first sensor is confirmed;
in response to determining that the performance limitation of the first sensor is confirmed, determining that the coverage zone is only covered by the second sensor and determining whether the performance limitation of the first sensor is temporary; and
in response to determining that the performance limitation of the first sensor is temporary, adjusting the zone associated risk of the coverage zone to the performance risk of the second sensor.

21. The data processing system of claim 20, wherein the operations further include:
in response to determining that the performance limitation of the first sensor is not temporary, determining whether the zone is covered by the second sensor; and
in response to determining that the zone is not covered by the second sensor, declaring the zone as a no coverage zone.

22. The data processing system of claim 17, wherein the operations further include: defining a performance limit detection window associated with the second sensor based on a MTBF lower limit of the second sensor and a MTBF upper limit of the second sensor.

23. The data processing system of claim 20, wherein the operations further include: adjusting the zone associated risk of the coverage zone to a combined performance risk of the first and second sensors subsequent to adjusting the zone associated risk of the coverage zone to the performance risk of the second sensor.

24. The data processing system of claim 17, wherein the operations further include:
determining whether the operating time of the ADV operating in AD mode is within the performance limit detection window associated with the second sensor;
in response to determining that the operating time of the ADV operating in AD mode is within the performance limit detection window of the second sensor, ensuring the second sensor is operating as intended based on additional diagnostics and determining that the coverage zone is only covered by the first sensor.

* * * * *